United States Patent
Lu et al.

(10) Patent No.: US 9,223,452 B2
(45) Date of Patent: Dec. 29, 2015

(54) NOISE-CANCELLING INTEGRATED TOUCH SCREEN AND DISPLAY PANEL AND DRIVE METHOD THEREOF

(71) Applicant: Shanghai Tianma Micro-Electronics Co., Ltd., Shanghai (CN)

(72) Inventors: Feng Lu, Shanghai (CN); Jun Ma, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 63 days.

(21) Appl. No.: 14/133,506

(22) Filed: Dec. 18, 2013

(65) Prior Publication Data

US 2014/0204055 A1 Jul. 24, 2014

(30) Foreign Application Priority Data

Jan. 23, 2013 (CN) .......................... 2013 1 0025238

(51) Int. Cl.
*G06F 3/044* (2006.01)
*G06F 3/041* (2006.01)
*G09G 3/36* (2006.01)

(52) U.S. Cl.
CPC .............. *G06F 3/044* (2013.01); *G06F 3/0412* (2013.01); *G06F 3/0416* (2013.01); *G06F 3/0418* (2013.01); *G09G 3/3648* (2013.01)

(58) Field of Classification Search
CPC ........ G06F 3/044; G06F 3/0412; G06F 3/042
See application file for complete search history.

(56) References Cited

U.S. PATENT DOCUMENTS

| | | | |
|---|---|---|---|
| 2008/0062147 A1* | 3/2008 | Hotelling et al. | 345/174 |
| 2010/0066650 A1 | 3/2010 | Lee et al. | |
| 2010/0136868 A1 | 6/2010 | Chien et al. | |
| 2011/0115724 A1* | 5/2011 | Jeon et al. | 345/173 |
| 2011/0175824 A1 | 7/2011 | Chiu et al. | |
| 2011/0254802 A1 | 10/2011 | Philipp | |
| 2012/0044180 A1 | 2/2012 | Matsui et al. | |

FOREIGN PATENT DOCUMENTS

WO 2007/146785 A2 12/2007

OTHER PUBLICATIONS

Notification of Transmittal of the European Search Report and the Written Opinion of the European Searching Authority for Application No. 13199770.2 mailed on Aug. 18, 2014, 13 pages.

* cited by examiner

*Primary Examiner* — Dwayne Bost
*Assistant Examiner* — Sepehr Azari
(74) *Attorney, Agent, or Firm* — Alston & Bird LLP

(57) ABSTRACT

An In-cell touch screen and a method for driving the same includes: concurrently providing a plurality of gate drive signals to the plurality of gate lines line by line and a plurality of touch drive signals to the plurality of drive lines line by line, collecting original touch signals from the plurality of sensing lines line by line; when collecting is performed on a sensing line and any gate line covered by the sensing line is supplied with a gate drive signal, defining the original touch signals collected from a sensing line as interference signals; and removing the interference signals from the original touch signals to obtain a valid touch signal.

20 Claims, 9 Drawing Sheets

NOISE-CANCELLING INTEGRATED TOUCH SCREEN AND DISPLAY PANEL AND DRIVE METHOD THEREOF

CROSS REFERENCE TO RELATED APPLICATIONS

This application claims the benefit of priority to Chinese Patent Application No. 201310025238.5, filed with the Chinese Patent Office on Jan. 23, 2013 and entitled "IN-CELL TOUCH SCREEN AND DRIVE METHOD THEREOF", the contents of which is incorporated herein by reference in its entirety.

BACKGROUND OF THE INVENTION

The In-cell touch screen is popular because the touch system can be integrated with the display screen so that the thickness of the whole liquid crystal display (LCD) can be reduced effectively and the manufacturing process can be simplified. LCD usually includes a color film substrate and an array substrate. In the In-cell touch screen, the touch system is usually disposed at the side of the color film substrate since the array substrate usually includes more circuit designs.

As shown in FIG. 1, a touch layer 100 is integrated at the side of the color film substrate in the In-cell touch screen. The touch layer 100 includes a plurality of drive lines 101 and sensing lines 102. The sensing lines 102 in each row are separated by the drive lines 101 and the separated sensing lines 102 in each row are connected by bridges 103 in the horizontal direction. Display function and touch function are integrated in the In-cell touch screen. Progressive scanning is performed on the drive lines of the touch layer to achieve the touch function, while progressive scanning is performed on gate lines on the array substrate to achieve the display function. The operating principle of touch detection is as follows: drive signals are applied to the drive lines, a signal change is detected on the sensing lines, X-directional coordinates are determined by the drive lines and Y-directional coordinates are determined by the sensing lines; during the detection, progressive scanning is performed on the X-directional drive lines, the signal on each sensing line is read when each of the driving lines is scanned, all the intersecting points of the rows and columns are gone through in a round of scanning, to determine the location of a touch action.

A time-sharing driving manner of display drive and touch drive is usually adopted for the In-cell touch screen. A scanning period T includes a display drive time duration T1 and a touch drive time duration T2, which means T=T1+T2. That is to say, in one scanning period T, the display drive scanning is completed in T1 and then the touch drive scanning is completed in T2. For the display drive, longer display drive time duration T1 means longer charging time of Thin Film Transistors (TFTs) on the array substrate and better display effect; for the touch drive, longer touch drive time duration T2 means better effect of touch detection. The display drive time duration T1 and the touch drive time duration T2 should both be extended in order to ensure both the display effect and the touch detection effect. Longer display drive time duration T1 and touch drive time duration T2 are needed especially for large-size and high-resolution touch display screens. Therefore, there may not be enough time to be allocated in one scanning period.

Accordingly, the drive method in which the display drive and the touch drive are driven simultaneously is also adopted in the industry. That is to say, the display drive scanning and the touch drive scanning are performed simultaneously in one scanning period, whereby the charging and discharging of the TFTs on the array substrate will be completed in the scanning period T. However, capacitive couplings may be generated from the charging and discharging of the TFTs and turn into noises that may affect the touch function and cause the problems of low signal noise ratio (SNR) for the touch control and even false touch.

BRIEF SUMMARY OF THE INVENTION

Embodiments of the present invention provide an In-cell touch screen and a method for driving the same to solve the problems of low SNR for touch control and the occurrence of false touch in which the display and the touch are driven simultaneously in the prior art. According to the present invention, enhanced accuracy of touch control and improved degree of satisfaction can be achieved.

One embodiment provides a method for driving In-cell touch screen to solve the above-described technical problems. The In-cell touch screen includes an array substrate and a color film substrate disposed opposite to each other. The color film substrate includes a plurality of drive lines and a plurality of sensing lines intersecting with the plurality of drive lines in an insulating way, the array substrate includes a plurality of gate lines and a plurality of data lines intersecting with each other and insulated from each other.

According to another embodiment, the method for driving the In-cell touch screen includes: concurrently providing a plurality of gate drive signals to the plurality of gate lines line by line and providing a plurality of touch drive signals to the plurality of drive lines line by line, and collecting original touch signals from the plurality of sensing lines line by line; when collecting is performed on a sensing line and any of the gate lines covered by the sensing line is being applied with the gate drive signal. The method further includes defining the original touch signals collected from the sensing line as interference signals; and removing the interference signals from the original touch signals to obtain a valid touch signal.

Optionally, the color film substrate includes:

a transparent substrate, wherein the plurality of drive lines and the plurality of sensing lines are formed on the transparent substrate, each of the plurality of sensing lines is divided into a plurality of segments by the plurality of drive lines;

an color-resist insulating layer laid on the plurality of drive lines and the plurality of sensing lines, wherein the color-resist insulating layer includes a plurality of via holes; and a metal bridging layer formed on the color-resist insulating layer, wherein the segments of the plurality of sensing lines are connected through the via holes by the metal bridging layer.

Optionally, in the drive method of the In-cell touch screen, the color film substrate further includes a black matrix layer formed between the transparent substrate with the plurality of drive lines and sensing lines.

Optionally, in the drive method of the In-cell touch screen, the plurality of drive lines and the plurality of sensing lines include a latticed metal layer respectively, the latticed layers are covered by the black matrix layer.

Optionally, in the drive method of the In-cell touch screen, after removing the interference signals from the original touch signals, an average of remaining original touch signals collected from each sensing line is taken as the valid touch signal of the sensing line.

Optionally, in the drive method of the In-cell touch screen, n touch scans on all the drive lines and sensing lines are accomplished in m display scanning periods T for all the gate lines, where m and n are integers greater than or equal to 1.

Optionally, in the drive method of the In-cell touch screen, m equals to 1 and n is greater than 1.

Optionally, in the drive method of the In-cell touch screen, n is in a range between 3 and 5.

Optionally, in the drive method of the In-cell touch screen, a preset beginning time t1 and a preset finishing time t2 are set for each sensing line in one display scanning period T, and the original touch signals collected by the sensing line from the preset beginning time t1 to the preset finishing time t2 are defined as the interference signals.

Optionally, in the drive method of the In-cell touch screen, the number of the gate lines is x, the number of the sensing lines is y, one of the y sensing lines is spaced from the first gate line of the display scan by g gate lines, and the one sensing line covers s gate lines, where x, y, g and s are all integers greater than or equal to 1 and x is greater than or equal to y.

Optionally, in the drive method of the In-cell touch screen, the preset beginning time t1 and the preset finishing time t2 are calculated from the following formulas:

$$t1=(g+1)\times T/x$$

$$t2=(g+1+s)\times T/x.$$

Optionally, s is in a range between 50 and 70.

Accordingly, another embodiment further provides an In-cell touch screen, the In-cell touch screen includes an array substrate, a color film substrate disposed opposite to the array substrate, and a drive device, wherein the color film substrate includes a plurality of drive lines and a plurality of sensing lines intersecting with the plurality of drive lines in an insulating way; the array substrate includes a plurality of gate lines and a plurality of data lines intersecting with the plurality of gate lines in an insulating way, each of the sensing lines is parallel to the gate lines and covers multiple gate lines; the drive device includes a display drive circuit and a touch drive circuit, the display drive circuit provides gate drive signals to the plurality of gate lines line by line, meanwhile the touch drive circuit provides touch drive signals to the plurality of drive lines line by line, and original touch signals are collected from the plurality of sensing lines line by line. When collecting is performed on the sensing line and any of the gate lines covered by the sensing line is applied with the gate drive signal, the original touch signals collected from the sensing line are defined as interference signals. The touch drive circuit removes the interference signals from the original touch signals to obtain valid touch signals.

Optionally, in the In-cell touch screen, the color film substrate includes:

a transparent substrate, wherein the plurality of drive lines and the plurality of sensing lines are formed on the transparent substrate, each of the plurality of sensing lines is divided into a plurality of segments by the plurality of drive lines;

an color-resist insulating layer laid on the plurality of drive lines and the plurality of sensing lines, wherein the color-resist insulating layer includes a plurality of via holes; and a metal bridging layer formed on the color-resist insulating layer, wherein the segments of the plurality of sensing lines are connected through the via holes by the metal bridging layer.

Optionally, in the In-cell touch screen, the color film substrate further includes a black matrix layer formed between the transparent substrate with the plurality of drive lines and sensing lines.

Optionally, in the In-cell touch screen, the plurality of drive lines and the plurality of sensing lines include a latticed metal layer respectively, the latticed layers are covered by the black matrix layer.

Optionally, in the In-cell touch screen, the touch drive circuit takes an average of remaining original touch signals collected from each sensing line as the valid touch signal of the sensing line after removing the interference signals from the original touch signals.

Optionally, in the In-cell touch screen, n touch scans on all the drive lines and sensing lines are accomplished in m display scanning periods T for all the gate lines, wherein m and n are integers greater than or equal to 1.

Optionally, in the In-cell touch screen, m equals to 1 and n is greater than 1.

Optionally, in the In-cell touch screen, n is in a range between 3 and 5.

Optionally, in the In-cell touch screen, a preset beginning time t1 and a preset finishing time t2 are set for each sensing line in one display scanning period T, and the original touch signals collected from the preset beginning time t1 to the preset finishing time t2 by the sensing line are defined as the interference signals.

Optionally, in the In-cell touch screen, the number of the gate lines is x, the number of the sensing lines is y, one of the y sensing lines is spaced from the first gate line of the display scan by g gate lines, and the one sensing line covers s gate lines, where x, y, g and s are all integers greater than or equal to 1 and x is greater than or equal to y.

Optionally, in the In-cell touch screen, the preset beginning time t1 and the preset finishing time t2 are calculated from the following formulas:

$$t1=(g+1)\times T/x$$

$$t2=(g+1+s)\times T/x.$$

Optionally, in the In-cell touch screen, s is in a range between 50 and 70.

In the In-cell touch screen and the drive method thereof provided in the invention embodiment, the manner of simultaneous display drive and touch drive is adopted, in which the gate drive signals are provided to the plurality of gate lines line by line, the touch drive signals are provided to the plurality of drive lines line by line at the same time and original touch signals are collected from the plurality of sensing lines line by line. The scanning period of the display drive and the scanning period of the touch drive are both extended with the simultaneous drive method as compared to time-sharing drive method in the prior art. Besides, in the method, when collecting is performed on the sensing line and any of the gate lines covered by the sensing line is applied with the gate drive signal, the original touch signals collected from the sensing line are defined as interference signals; the interference signals are removed from the original touch signals and valid touch signal is obtained. That is to say, with the In-cell touch screen and the drive method thereof provided in the invention embodiment, the interference signals caused by TFT charging are removed while adopting the simultaneous drive method, the severe touch noises caused by TFT charging are avoided, the SNR of the touch signals is enhanced effectively, thereby the objectives of enhancing touch accuracy and improving touch experience are realized.

DETAILED DESCRIPTION OF THE PREFERRED EMBODIMENTS

Specific embodiments are described below. Although the invention will be described with reference to the exemplary embodiments thereof, the following exemplary embodiments and modifications do not restrict the invention.

Embodiments of the present invention provide a method for driving an In-cell touch screen. The structure of the In-cell touch screen will be explained at first for the purpose of convenience in explaining the method. The In-cell touch screen according to an embodiment of the invention includes an array substrate and a color film substrate disposed opposite to each other, wherein a touch function layer of the In-cell touch screen is integrated on the color film substrate.

Figure 1:
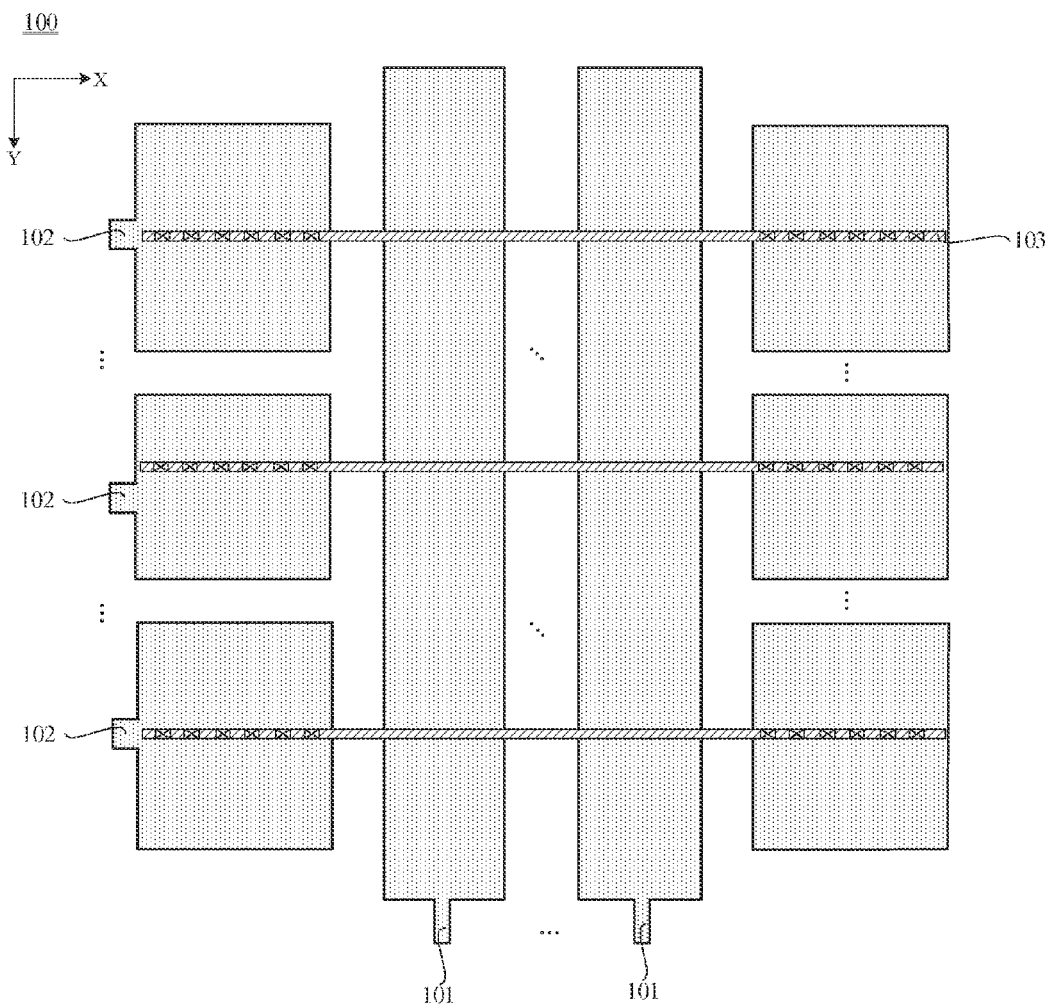
FIG. 1 is a schematic structure diagram of the touch layer in the prior art.
Figure 2:
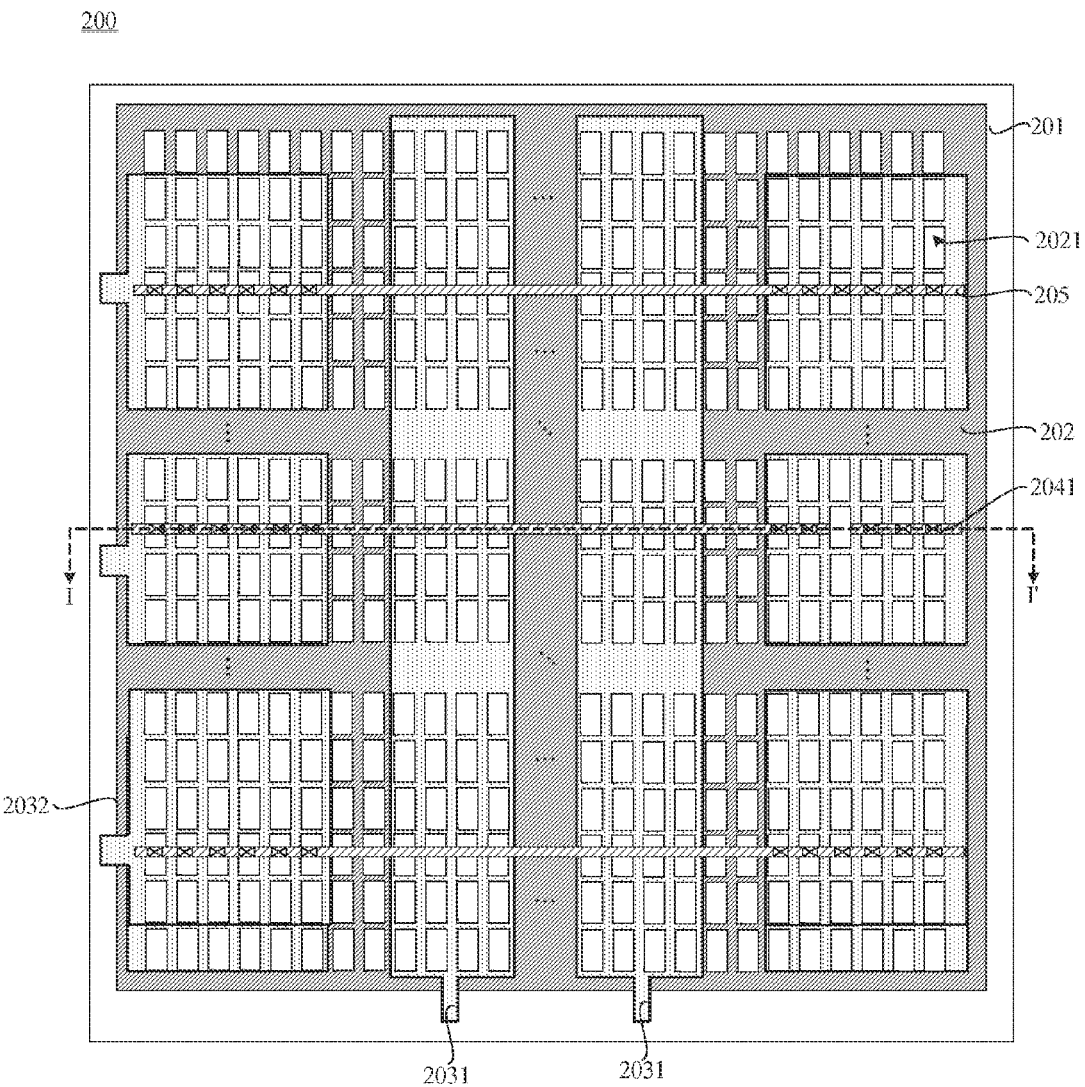
FIG. 2 is a schematic structure diagram of the color film substrate in the In-cell touch screen according to an embodiment of the invention.
Figure 3:
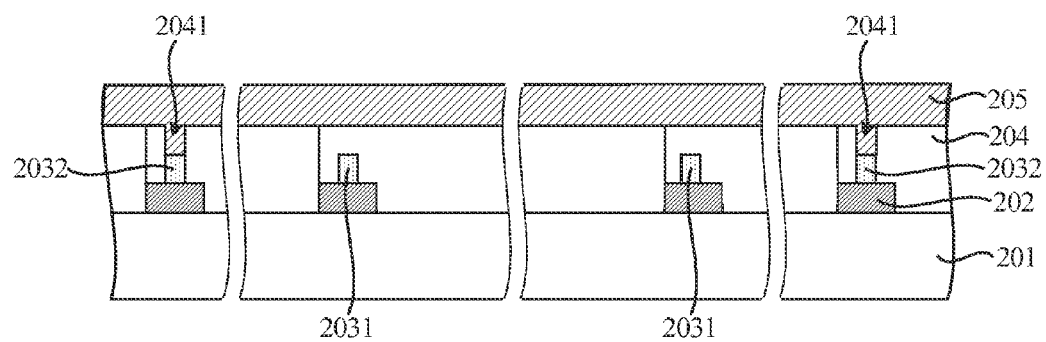
FIG. 3 is a sectional diagram taken along I-I' direction of FIG. 2.

As shown in FIG. 2 and FIG. 3, the color film substrate 200 includes a transparent substrate 201, a black matrix layer 202 formed on the transparent substrate 201, a conductive layer formed on the black matrix layer 202, and an color-resist insulating layer 204 formed on the conductive layer. The conductive layer includes a plurality of drive lines 2031 and a plurality of sensing lines 2032, each sensing line 2032 is divided into a plurality of segments by the plurality of drive lines 2031, and the plurality of drive lines 2031 intersect with the plurality of sensing lines 2032 perpendicularly, and the drive lines and sensing lines are insulated from each other. The black matrix layer 202 includes a plurality of openings 2021, and the color-resist insulating layer 204 is formed on regions of the openings 2021. The plurality of drive lines 2031 and the plurality of sensing lines 2032 are formed on the non-opening regions of the black matrix layer 202 in the form of a latticed metal layer, which means that the latticed metal layer is covered by the black matrix layer 202. Of course, the drive lines 2031 and the sensing lines 2032 can be extended from the non-opening regions to the regions of openings to reduce resistances of the drive lines 2031 and the sensing lines 2032. A transparent conductive layer can be used as the conductive layer to avoid the decrease of the aperture ratio. Usually the color-resist insulating layer 204 includes RGB color-resist units arranged in an array. The color-resist insulating layer 204 includes a plurality of via holes 2041. The color film substrate 200 further includes a metal bridging layer 205 formed on the color-resist insulating layer 204, and the segments of each of the plurality of sensing lines 2032 are connected together by the metal bridging layer 205 through the via holes 2041. Moreover, the metal bridging layer 205 may also be covered by the black matrix layer 202 to increase the aperture ratio.

Figure 4:
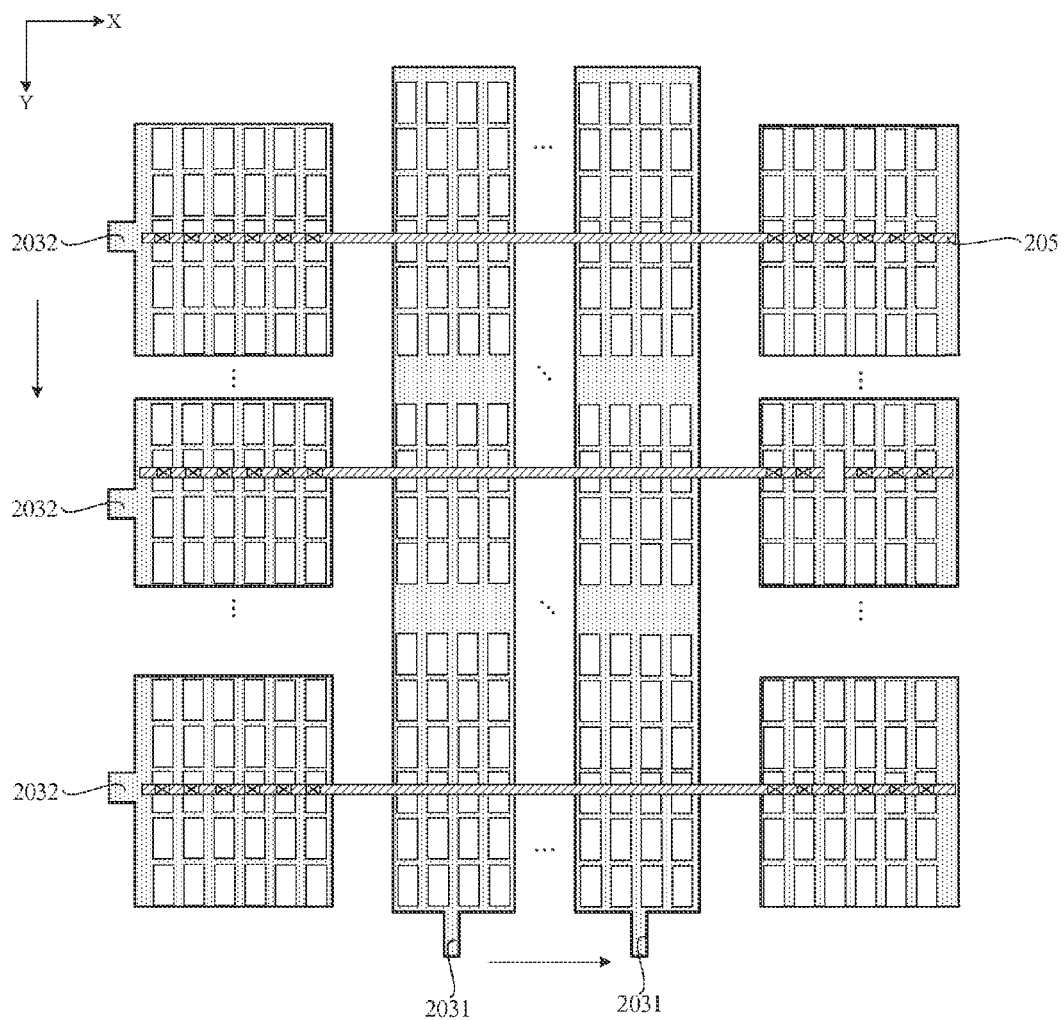
FIG. 4 is a schematic diagram of the method for touch drive in the In-cell touch screen according to an embodiment of the invention.
Figure 5:
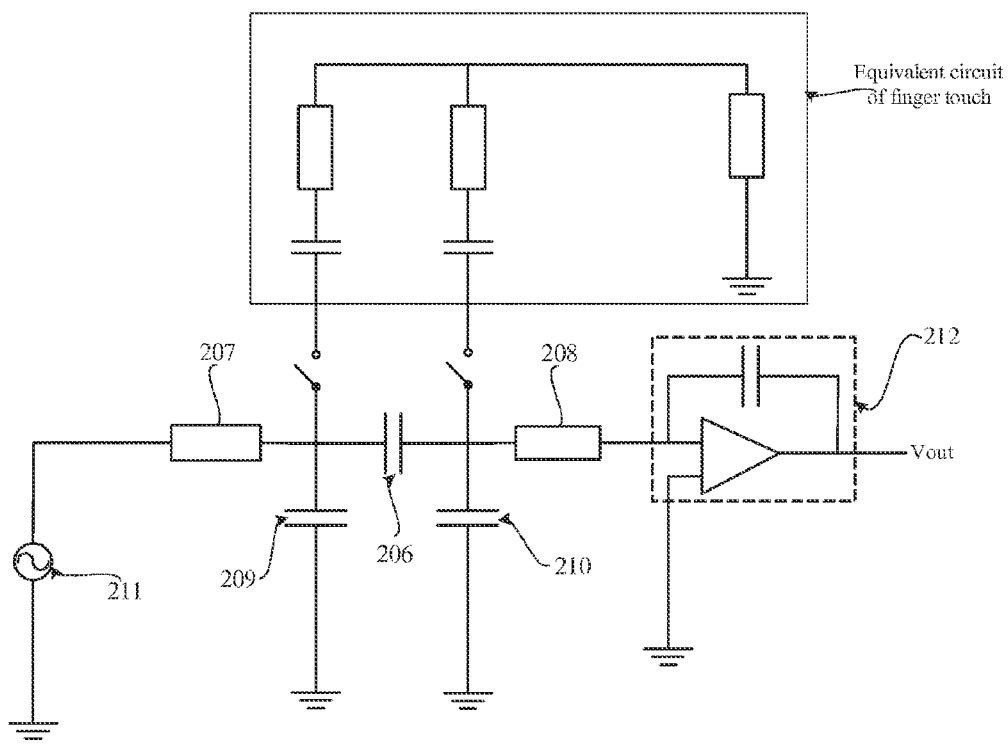
FIG. 5 is an equivalent touch circuit diagram of the drive line and the sensing line in the In-cell touch screen according to an embodiment of the invention.

The operating principle of the touch detection of the touch function layer integrated on the color film substrate 200 is as follows: as shown in FIG. 4, a drive signal is applied to each of the drive lines 2031, the change of the detecting signal is collected on each of the sensing lines 2032; X-directional coordinates are determined by the drive lines 2031 and Y-directional coordinates are determined by the sensing lines 2032. During the detection, a progressive scanning is performed on the X-directional drive lines 2031, the signal is read on each sensing line 2032 when each of the drive lines 2031 is scanned, and all the intersecting points of the rows and the columns are gone through in a round of scanning to determine the location of a touch event. FIG. 5 is an equivalent circuit diagram of one of the intersecting points between the drive lines 2031 and the sensing lines 2032. Each intersecting point is equivalent to a coupled mutual capacitor 206. The equivalent resistor of the drive line 2031 is defined as resistor 207, the equivalent resistor of the sensing line 2032 is defined as resistor 208, the parasitic capacitor between the drive line 2031 and the ground is defined as capacitor 209, and the parasitic capacitor between the sensing lines 2032 and the ground is defined as capacitor 210. An excitation source 211 generates the drive signal, a touch detection circuit 212 is equivalent to an amplifier for converting the electric signal on the sensing line 2031 into a voltage signal Vout. When a touch by a finger occurs, it may be considered that a connection is made between the drive line 2031 and the sensing line 2032 at the touch point of the finger, which is equivalent to a capacitor connected in parallel with the mutual capacitor 206, hence the capacitance of the mutual capacitor 206 is increased accordingly, the electric signal on the sensing line 2032 is changed, and the output voltage Vout is changed. In other words, once any change in the capacitance of the mutual capacitor 206 is detected, it may be determined that a touch event occurs. In this way, all the factors causing the change in the capacitance of the mutual capacitor 206 except finger touches are noises for touch detection, and false touch will be detected if the noise is too large.

Figure 6:
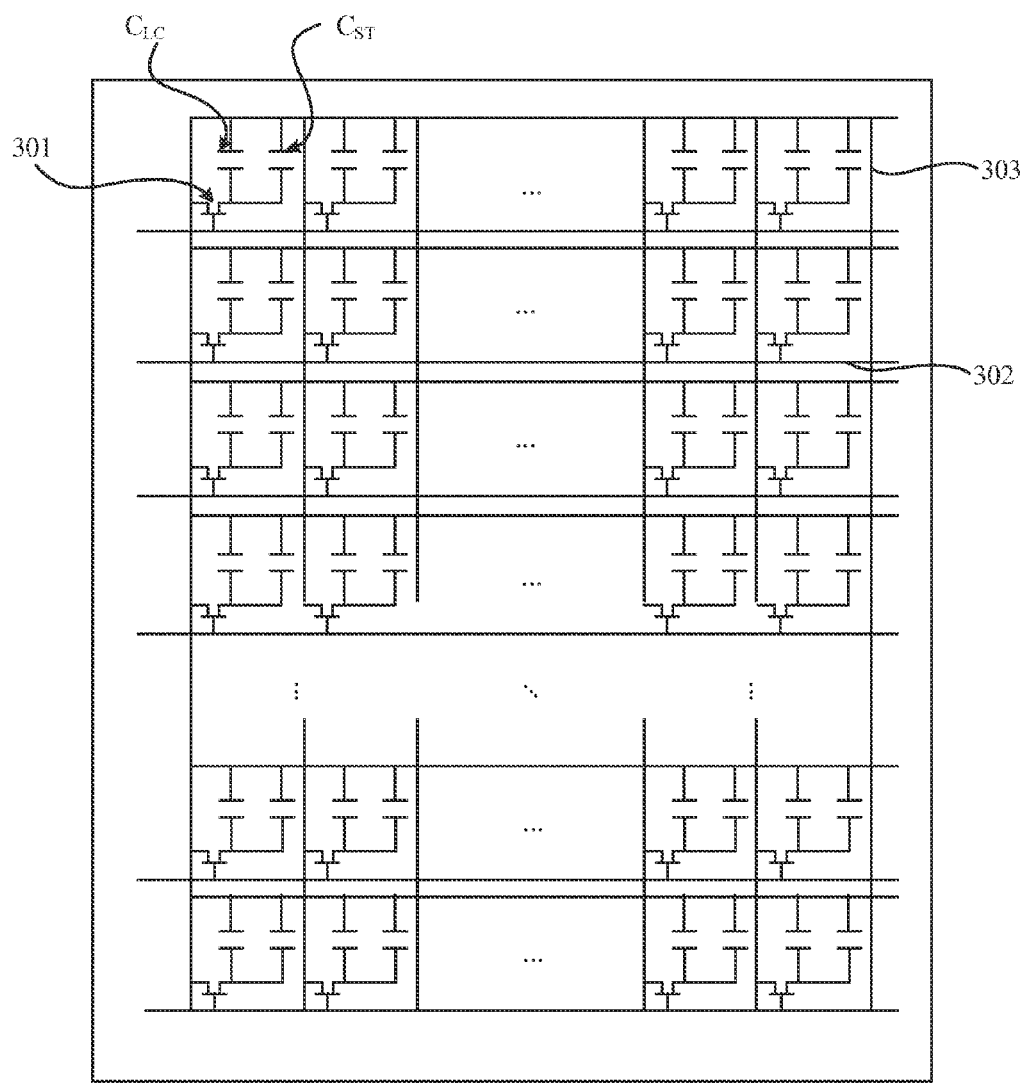
FIG. 6 is a schematic structure diagram of the array substrate in the In-cell touch screen according to an embodiment of the invention.

FIG. 6 is an array substrate 300, which includes a plurality of Thin Film Transistors (TFTs) 301, and a plurality of gate lines 302 and a plurality of data lines 303 intersecting perpendicularly with each other and insulated from each other. At each intersecting point between the gate lines 302 and the data lines 303 there is a TFT 301 for driving a liquid crystal element CLC located at the intersecting point. A gate electrode of the TFT 301 is electrically connected with a gate line 302, a source/drain electrode of the TFT 301 is electrically connected with a data line 303, and a drain/source electrode of the TFT 301 is electrically connected with a pixel electrode in the liquid crystal element CLC. Moreover, a storage capacitor CST is provided on the array substrate 300 for maintaining a voltage of the liquid crystal element CLC. The TFT 301 is turned on when a gate voltage is provided to the TFT 301 by the gate line 302; at this time the storage capacitor CST may be charged by a drive voltage provided by data line 303 and the charged storage capacitor CST may provide an electric field for the liquid crystal element CLC continuously to change the arrangement of liquid crystal molecules thereby controlling the light transmittance of the liquid crystal element CLC. That is to say, all the storage capacitors CST on a gate line 302 start to be charged when the gate line 302 is supplied with the gate voltage.

In the In-cell touch screen, in the case where each of the sensing lines 2032 is parallel to the gate lines 302, which means that each of the drive lines 2031 is perpendicular with the gate lines 302, all the storage capacitors CST on a gate line 302 start to be charged when the gate line 302 is applied with the gate voltage. It is equivalent to the case where the mutual capacitor 206 is connected with the charged storage capacitor CST in parallel, which means that the storage capacitor CST is a noise for touch control. The width of each of the sensing lines 2032 is generally much larger than that of each of the gate lines 302, which means that each sensing line 2032 can cover multiple gate lines 302, and each gate line 302 covered by the sensing line 2032 will incur noise to the sensing line.

Figure 7:
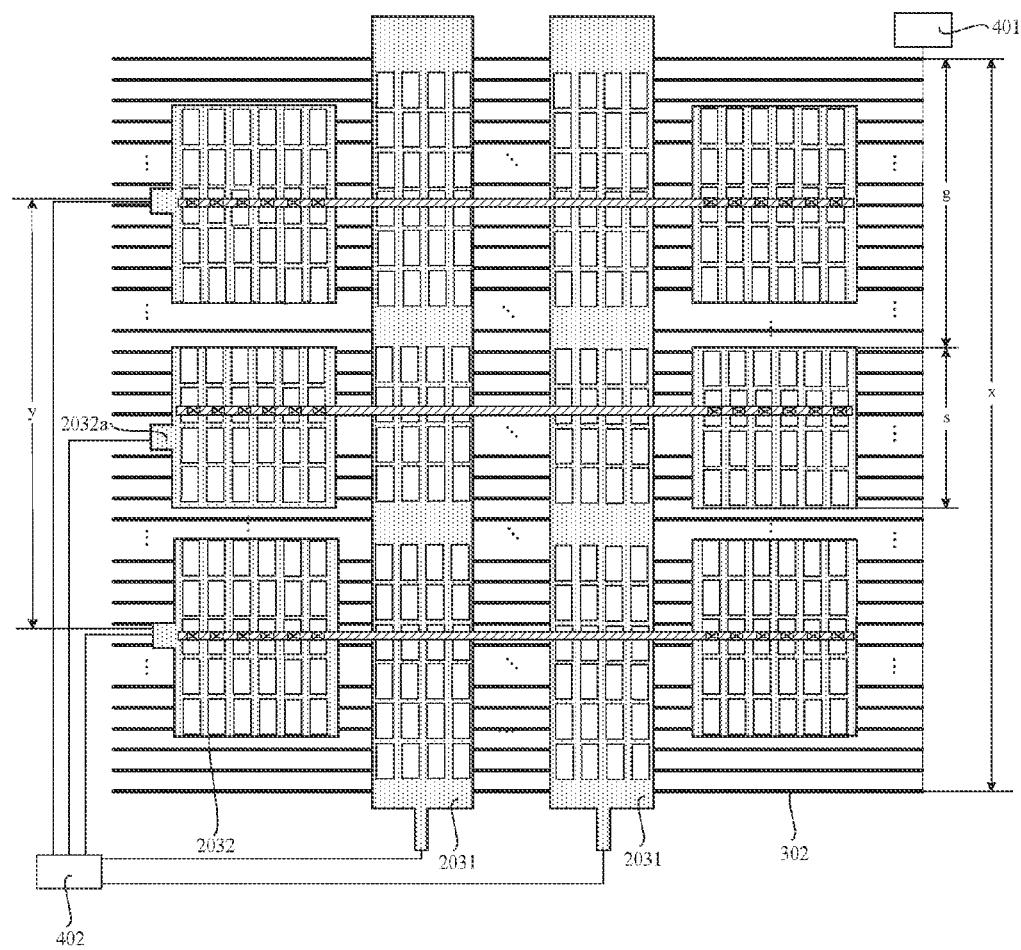
FIG. 7 is a schematic structure diagram of the In-cell touch screen according to an embodiment of the invention.

As shown in FIG. 7, a display drive circuit 401 provides gate drive signals to the plurality of gate lines 302 line by line from top to bottom, and at the same time, a touch drive circuit 402 provides touch drive signals to the plurality of drive lines 2031 line by line from left to right, and original touch signals are collected from the plurality of sensing lines 2032 line by line from top to bottom.

The sensing lines 2032 are parallel to the gate lines 302, and the width of each of the sensing lines 2032 is generally much greater than the width of each of the gate lines 302, so one sensing line 2032 can cover a multitude of the gate lines 302 and the number of the sensing lines 2032 is less than the number of the gate lines 302. In this embodiment, the number of the gate lines is x, the number of the sensing lines is y, and x is greater than y, where x and y are integers greater than or equal to 1. The number of gate lines between a certain sensing line 2032a and the first gate line after a scanning begins is indicated by g, and the number of the gate lines covered by the sensing line is indicated by s, where g and s are integers greater than or equal to 1. In a specific embodiment, s is in the range between 50 and 70.

The time for one progressive scan on all the gate lines 302 by the display drive circuit 401 is a display scanning period T. A number of N touch scans on all the drive lines 2031 and the sensing lines 2032 can be accomplished in m display scanning periods (m*T) because the display drive and the touch drive are carried out simultaneously (concurrently) and separately, where m and n are integers greater than 1. The time for one progressive scan on all the drive lines 2031 by the touch drive circuit 402 is a touch scanning period T1. The number of the drive lines 2031 is much smaller than the number of the gate lines 302, so the touch scanning period T1 is generally shorter than the display scanning period T. Therefore, multiple touch scans can be accomplished in one display scanning period T, which means that m=1 and n is an integer greater than 1.

In the display scanning period T, this case is inevitable: when a sensing line 2032 is scanned by the touch drive circuit 402, a gate line 302 covered by the sensing line is scanned by the display drive circuit 401, and storage capacitors CST on the gate line all start to be charged because the gate line 302 is supplied with a gate drive voltage, the charged storage capacitors CST, however, present noises to the touch mutual capacitor 206. That is to say, when a sensing line 2032 is scanned by the touch drive circuit 402 and any gate line 302 covered by the sensing line 2032 is being supplied with the gate drive signal, the original touch signal collected by the sensing line 2032 is a touch noise and is defined as interference signal.

In detail, with regard to a sensing line 2032a which covers s gate lines 302, when the display drive circuit 401 begins scanning, a display drive signal needs a time t1 to arrive at the first gate line covered by the sensing line 2032a, and needs a time t2 to arrive at the last gate line covered by the sensing line 2032a, where the time t1 and the time t2 can be derived by the following formulas:

$$t1=(g+1)\times T/x$$

$$t2=(g+1+s)\times T/x.$$

That is to say, there is always one of the gate lines covered by the sensing line 2032a being supplied with the gate drive voltage during the time period from t1 to t2. In other words, there are always some of the storage capacitors CST covered by the sensing line 2032a being in a state of charging. The storage capacitors CST in the state of charging are noises for the touch mutual capacitor 206, so the original touch signal collected from the sensing line 2032a is the interference signal. Therefore, for the sensing line 2032a, a preset beginning time t1 and a preset finishing time t2 can be set, the original touch signals collected by the sensing line from the preset beginning time t1 to the preset finishing time t2 can be defined as the interference signals. The interference signals are removed by the touch drive circuit 402 from the original touch signals collected by the sensing line, and valid touch signals of the sensing line are obtained.

When m=1 and n is greater than 1, n scans may be accomplished on all the drive lines 2031 by the touch drive circuit 402 in one display scanning period T, and n collections of signals are accomplished on all the sensing lines 2032. Not only the time of touch detection but also the detection times of the detecting signals are increased in the display scanning period T as compared to time-sharing scanning in the prior art. Signal loss caused by signal screening can be compensated by performing a plurality of touch scans in the display scanning period; at the same time, the number of the valid signals can be greatly increased through the plurality of touch scans, which is advantageous for the driving IC to calculate touch position more accurately. The conception (notion) of report rate can be introduced to describe the times of the valid touch signals detected from each sensing line in the display scanning period T. For a certain sensing line 2031a, the report rate of each touch spot on the sensing line can be defined with the following formula:

$$P=n(1-s/x)$$

Apparently the report rate increases proportionally with the increase of n, but the average detection time for each sensing line 2031 decreases. A balance between the report rate and the detection time is needed to ensure the touch detection accuracy and the detection time. In an embodiment, n is in the range between 3 and 5.

The number of the original touch signals collected from each sensing line 2032 by the touch drive circuit 402 in the display scanning period T is n, and the number of remaining original touch signals after removing the interference signals from the original touch signals may be greater than 1. After removing the interference signals from the original touch signals, the average of the remaining touch signals collected by each sensing line 2032 can be taken as the valid touch signal of the sensing line. Of course, different algorithms can be adopted for calculating the valid touch signal according to actual needs, for example, the summary or the weighted average of the remaining original touch signals can be also taken as the valid touch signal of the sensing line.

Figure 8:
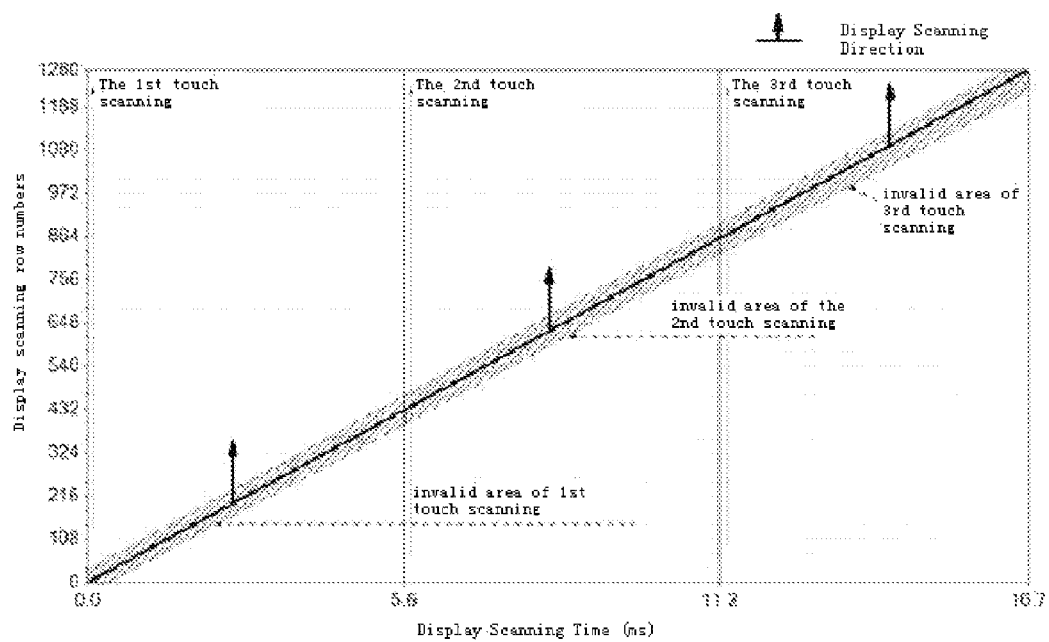
FIG. 8 is a graph showing the principle of the touch scanning and display scanning in the drive method for the In-cell touch screen when m=1, n=3 according to an embodiment of the invention.
Figure 9:
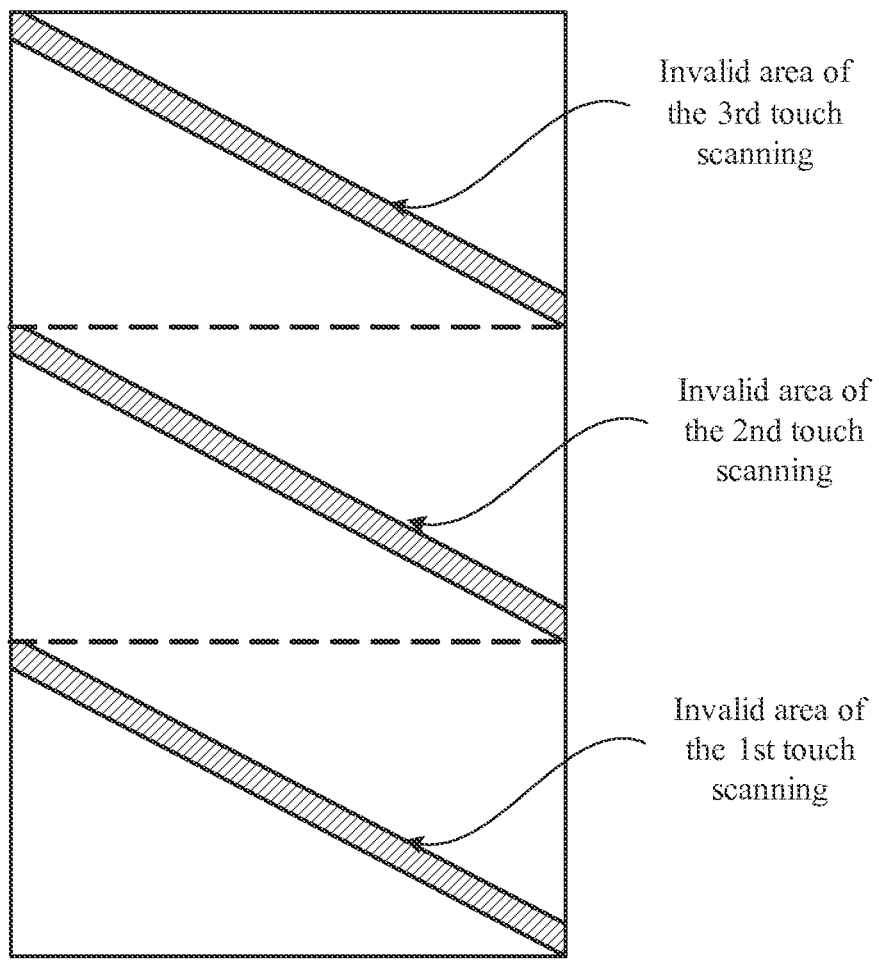
FIG. 9 is a distribution diagram of invalid regions for the touch scanning in the displayed image of the drive method as shown in FIG. 8.

Here, the method for driving an In-cell touch screen will be explained with the example of m=1 and n=3. A typical display scanning frequency is 60 Hz, and the display scanning period T equals to 16.67 ms. The touch scanning period T1 equals to 5.6 ms when n=3. As shown in FIG. 8, three touch scans can be accomplished in the display scanning period T. Shaded areas in FIG. 8 represent overlapping time in which the gate lines undergo display scan and the sensing lines undergo touch detect. As shown in FIG. 9, three touch detections on all sensing lines can be accomplished in a frame of display image when adopting the drive method shown in FIG. 8. The shaded areas represent overlapping areas of display scanning drive and touch scanning drive. Original touch detection signals detected in each touch scanning period in the corresponding shaded areas are all the interference signals. There are two original touch signals for each sensing line after removing the interference signals, and the average or the weighted average of the remained two original touch signals can be taken as the valid touch signal.

According to the present invention, the method for driving an In-cell touch screen, wherein the In-cell touch screen comprises an array substrate and a color film substrate disposed opposite to each other, the color film substrate comprises a plurality of drive lines and a plurality of sensing lines intersecting with each other and insulted from each other, the array substrate comprises a plurality of gate lines and a plurality of data lines intersecting with each other and insulted from each other, each of the sensing lines is parallel to the gate lines and covers multiple gate lines, the drive method of the In-cell touch screen includes concurrently providing a plurality of gate drive signals to the plurality of gate lines line by line and a plurality of touch drive signals to the plurality of drive lines line by line. The method also includes collecting original touch signals from the plurality of sensing lines line by line, when collecting is performed on the a sensing line and any of the gate lines covered by the sensing line is applied supplied with the a gate drive signal. The method further includes defining the original touch signals collected from one the sensing line as interference signals, and removing the interference signals from the original touch signals to obtain a valid touch signal.

In addition, the In-cell touch screen including a drive device using the In-cell touch screen drive method also falls in the scope of the invention. The In-cell touch screen includes a display drive circuit 401 and a touch drive circuit 402, and the In-cell touch screen is driven by the display drive circuit 401 and the touch drive circuit 402 according to the drive method as described above.

In conclusion, a manner of simultaneous touch drive and display drive is adopted in the drive method, the original touch signals collected when any gate line covered by the sensing lines is being applied with the gate drive signal are defined as the interference signals; and the interference signals are removed from the original touch signals and the valid touch signals are obtained. That is to say, the interference signals caused by TFT charging are removed while adopting the simultaneous driving, the severe touch noises caused by TFT charging are avoided, the SNR of the touch signals can be enhanced effectively, thereby the objectives of enhancing touch accuracy and improving touch experience are realized.

Apparently, various changes and modifications can be made by those skilled in the art without departing from the spirit and the scope of the invention. In this way, the changes and modifications are included in the invention if the changes and modifications of the invention fall within the scope of the claims of the invention and the equivalents thereof.

What is claimed is:

1. A method for driving an In-cell touch screen, wherein the In-cell touch screen comprises an array substrate and a color film substrate disposed opposite to each other, the color film substrate comprises a plurality of drive lines and a plurality of sensing lines intersecting with the plurality of drive lines in an insulating way, the array substrate comprises a plurality of gate lines and a plurality of data lines intersecting with the plurality of gate lines in an insulating way, each of the sensing lines is parallel to the gate lines and covers multiple gate lines, the method comprising:
   concurrently providing a plurality of gate drive signals to the plurality of gate lines line by line and a plurality of touch drive signals to the plurality of drive lines line by line;
   collecting original touch signals from the plurality of sensing lines line by line; wherein collecting is performed on a sensing line and any of the gate lines covered by the sensing line is supplied with a gate drive signal;
   defining the original touch signals collected from the sensing line as interference signals; and
   removing the interference signals from the original touch signals to obtain a valid touch signal.

2. The method according to claim 1, wherein the color film substrate comprises:
   a transparent substrate, wherein the plurality of drive lines and the plurality of sensing lines are formed on the transparent substrate, each of the plurality of sensing lines is divided into a plurality of segments by the plurality of drive lines;
   a color-resist insulating layer on the plurality of drive lines and the plurality of sensing lines, wherein the color-resist insulating layer comprises a plurality of via holes; and a metal bridging layer formed on the color-resist insulating layer, wherein the segments of the plurality of sensing lines are connected through the via holes by the metal bridging layer.

3. The method according to claim 2, wherein the color film substrate further comprises a black matrix layer formed between the transparent substrate and the plurality of drive lines and sensing lines.

4. The method according to claim 3, wherein the plurality of drive lines and the plurality of sensing lines comprise a latticed metal layer respectively, and the latticed metal layers are covered by the black matrix layer.

5. The method according to claim 1, wherein after removing the interference signals from the original touch signals, an average of remaining original touch signals collected from each sensing line is taken as a valid touch signal of the sensing line.

6. The method according to claim 1, wherein a number n of touch scans on the drive lines and sensing lines are accomplished in a number m of display scanning periods T for all the gate lines, where m and n are integers greater than or equal to 1.

7. The method according to claim 6, wherein m equals to 1 and n is greater than 1.

8. The method according to claim 7, wherein n is in a range between 3 and 5.

9. The method according to claim 7, wherein a preset beginning time t1 and a preset finishing time t2 are set for each sensing line in one display scanning period T, and the original touch signals collected by the sensing line from the preset beginning time t1 to the preset finishing time t2 are defined as the interference signals.

10. The method according to claim 9, wherein a number of the gate lines is defined as x, a number of the sensing lines is defined as y, one of the y sensing lines is spaced from a first gate line of the display scan by g gate lines, and the one sensing line covers s gate lines, where x, y, g and s are integers greater than or equal to 1 and x is greater than or equal to y, and the preset beginning time t1 and the preset finishing time t2 are calculated from the following formulas:

$$t1=(g+1)\times T/x$$

$$t2=(g+1+s)\times T/x;$$

wherein s is in a range between 50 and 70.

11. An In-cell touch screen, comprising an array substrate, a color film substrate disposed opposite to the array substrate, and a drive device, wherein the color film substrate comprises a plurality of drive lines and a plurality of sensing lines intersecting with each other and insulated from each other; the array substrate comprises a plurality of gate lines and a plurality of data lines intersecting with each other and insulated from each other, each of the sensing lines is parallel to the gate lines and covers multiple gate lines; the drive device comprises a display drive circuit and a touch drive circuit, the display drive circuit provides gate drive signals to the plurality of gate lines line by line, at the same time, the touch drive circuit provides touch drive signals to the plurality of drive lines line by line, and original touch signals are collected from the plurality of sensing lines line by line; when collecting is performed on the sensing line and any of the gate lines covered by the sensing line is supplied with a gate drive signal, the original touch signals collected from one sensing line are defined as interference signals; and the touch drive circuit removes the interference signals from the original touch signals to obtain valid touch signals.

12. The In-cell touch screen according to claim 11, wherein the color film substrate comprises:
 a transparent substrate, wherein the plurality of drive lines and the plurality of sensing lines are formed on the transparent substrate, each of the plurality of sensing lines is divided into segments by the plurality of drive lines;
 a color-resist insulating layer laid on the plurality of drive lines and the plurality of sensing lines, wherein the color-resist insulating layer comprises a plurality of via holes; and
 a metal bridging layer formed on the color-resist insulating layer, wherein the segments of the plurality of sensing lines are connected through the via holes by the metal bridging layer.

13. The In-cell touch screen according to claim 12, wherein the color film substrate further comprises a black matrix layer formed between the transparent substrate and the plurality of drive lines and sensing lines.

14. The In-cell touch screen according to claim 13, wherein the plurality of drive lines and the plurality of sensing lines comprise a latticed metal layer respectively, and the latticed layers are covered by the black matrix layer.

15. The In-cell touch screen according to claim 11, wherein the touch drive circuit takes an average of remaining original touch signals collected from each sensing line as a valid touch signal of the sensing line after removing the interference signals from the original touch signals.

16. The In-cell touch screen according to claim 11, wherein n touch scans on all the drive lines and sensing lines are accomplished in m display scanning periods for all the gate lines, where m and n are integers greater than or equal to 1.

17. The In-cell touch screen according to claim 16, wherein m equals to 1 and n is greater than 1.

18. The In-cell touch screen according to claim 17, wherein n is in a range between 3 and 5.

19. The In-cell touch screen according to claim 18, wherein a preset beginning time t1 and a preset finishing time t2 are set for each sensing line in one display scanning period T, and the original touch signals collected from the preset beginning time t1 to the preset finishing time t2 by the sensing line are defined as the interference signals.

20. The In-cell touch screen according to claim 19, wherein a number of the gate lines is defined as x, the number of the sensing lines is defined as y, one of the y sensing lines is spaced from the first gate line of the display scan by g gate lines, and the one sensing line covers s gate lines, where x, y, g and s are integers greater than or equal to 1 and x is greater than or equal to y, the preset beginning time t1 and the preset finishing time t2 are calculated from the following formulas:

$$t1=(g+1)\times T/x$$

$$t2=(g+1+s)\times T/x;$$

wherein s is in a range between 50 and 70.

* * * * *